(12) United States Patent
Rajaendran et al.

(10) Patent No.: US 8,487,053 B2
(45) Date of Patent: Jul. 16, 2013

(54) METHODS FOR REMOVING POLYMER SKINS FROM REACTOR WALLS

(75) Inventors: George R. Rajaendran, Porter, TX (US); Max P. McDaniel, Bartlesville, OK (US); Gregory G. Hendrickson, Kingwood, TX (US); John D. Stewart, Friendswood, TX (US); John D. Hottovy, Kingwood, TX (US); Ted H. Cymbaluk, Seabrook, TX (US); Susannah Lane, Houston, TX (US); Richard A. Hernandez, Houston, TX (US); Elliott W. Johnson, Friendswood, TX (US); Qing Yang, Bartlesville, OK (US); William L. Valerioti, Houston, TX (US); Eric Schwerdtfeger, Bartlesville, OK (US); Albert P. Masino, Tulsa, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/307,053

(22) Filed: Nov. 30, 2011

(65) Prior Publication Data

US 2013/0137836 A1     May 30, 2013

(51) Int. Cl.
*C08F 2/00* (2006.01)
*C08F 4/00* (2006.01)
*C08F 4/44* (2006.01)
*C08F 210/00* (2006.01)

(52) U.S. Cl.
USPC .......... 526/64; 526/118; 526/119; 526/124.2; 526/129; 526/153; 526/348

(58) Field of Classification Search
USPC ............... 526/64, 118, 119, 124.2, 129, 153, 526/348
See application file for complete search history.

(56) References Cited

U.S. PATENT DOCUMENTS

| | | | |
|---|---|---|---|
| 2,825,721 | A | 3/1958 | Hogan et al. |
| 3,119,569 | A | 1/1964 | Baricordi |
| 3,225,023 | A | 12/1965 | Hogal et al. |
| 3,226,205 | A | 12/1965 | Rohlfing |
| 3,242,099 | A | 3/1966 | Manyik |
| 3,248,179 | A | 4/1966 | Norwood |
| 3,622,521 | A | 11/1971 | Hogan et al. |
| 3,625,864 | A | 12/1971 | Horvath |
| 3,887,494 | A | 6/1975 | Dietz |
| 3,900,457 | A | 8/1975 | Witt |
| 3,976,632 | A | 8/1976 | DeLap |
| 4,053,436 | A | 10/1977 | Hogan et al. |
| 4,081,407 | A | 3/1978 | Short et al. |
| 4,151,122 | A | 4/1979 | McDaniel et al. |

(Continued)

OTHER PUBLICATIONS

Smith, Michael A., Paper entitled, "Phillips Advanced Slurry Loop Technology," presented at The International Conference on Polyolefins, Polyolefins XI, Houston, Texas, Feb. 21-24, 1999; 12 pages.

(Continued)

*Primary Examiner* — William Cheung
(74) *Attorney, Agent, or Firm* — Merchant & Gould P.C.

(57) ABSTRACT

Methods for removing polymer skins or build-up from reactor walls in polymerization reactor systems containing a loop slurry reactor are disclosed. Such methods can employ removing some or all of the comonomer from the reactor system in combination with increasing the polymerization temperature of the loop slurry reactor.

27 Claims, 6 Drawing Sheets

U.S. PATENT DOCUMENTS

| | | |
|---|---|---|
| 4,182,815 A | 1/1980 | McDaniel et al. |
| 4,247,421 A | 1/1981 | McDaniel et al. |
| 4,248,735 A | 2/1981 | McDaniel et al. |
| 4,296,001 A | 10/1981 | Hawley |
| 4,297,460 A | 10/1981 | McDaniel et al. |
| 4,301,034 A | 11/1981 | McDaniel |
| 4,339,559 A | 7/1982 | McDaniel |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,397,769 A | 8/1983 | McDaniel et al. |
| 4,405,501 A | 9/1983 | Witt |
| 4,444,962 A | 4/1984 | McDaniel et al. |
| 4,444,964 A | 4/1984 | McDaniel et al. |
| 4,444,965 A | 4/1984 | McDaniel et al. |
| 4,460,756 A | 7/1984 | McDaniel et al. |
| 4,501,885 A | 2/1985 | Sherk |
| 4,504,638 A | 3/1985 | McDaniel et al. |
| 4,547,557 A | 10/1985 | McDaniel |
| 4,588,790 A | 5/1986 | Jenkins |
| 4,735,931 A | 4/1988 | McDaniel et al. |
| 4,806,513 A | 2/1989 | McDaniel et al. |
| 4,808,561 A | 2/1989 | Welborn |
| 4,820,785 A | 4/1989 | McDaniel et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,037,911 A | 8/1991 | McDaniel et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,275,992 A | 1/1994 | Mitchell et al. |
| 5,347,026 A | 9/1994 | Patsidis et al. |
| 5,352,749 A | 10/1994 | DeChellis |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin |
| 5,436,305 A | 7/1995 | Alt et al. |
| 5,451,649 A | 9/1995 | Zenk et al. |
| 5,455,314 A | 10/1995 | Burns |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,866,661 A | 2/1999 | Benham et al. |
| 6,197,899 B1 * | 3/2001 | Mitchell et al. .................. 526/64 |
| 6,239,235 B1 | 5/2001 | Hottovy |
| 6,262,191 B1 | 7/2001 | Hottovy |
| 6,300,271 B1 | 10/2001 | McDaniel |
| 6,355,594 B1 | 3/2002 | McDaniel |
| 6,395,666 B1 | 5/2002 | McDaniel |
| 6,548,442 B1 | 4/2003 | McDaniel et al. |
| 6,613,712 B1 | 9/2003 | McDaniel |
| 6,653,416 B2 | 11/2003 | McDaniel et al. |
| 6,831,141 B2 | 12/2004 | McDaniel et al. |
| 6,833,338 B2 | 12/2004 | McDaniel et al. |
| 6,833,415 B2 | 12/2004 | Kendrick |
| 7,294,599 B2 | 11/2007 | Jensen et al. |
| 7,312,283 B2 | 12/2007 | Martin et al. |
| 7,329,712 B2 | 2/2008 | Fouarge et al. |
| 7,417,097 B2 | 8/2008 | Yu et al. |
| 7,473,743 B2 | 1/2009 | Fouarge et al. |
| 7,645,841 B2 | 1/2010 | Shaw et al. |
| 2005/0095176 A1 | 5/2005 | Hottovy |
| 2009/0228259 A1 | 9/2009 | Gupta et al. |

OTHER PUBLICATIONS

Meyers, Robert A., Ph.D., entitled "Handbook of Petrochemicals Production Processes," (2005); 20 pages.

* cited by examiner

METHODS FOR REMOVING POLYMER SKINS FROM REACTOR WALLS

BACKGROUND OF THE INVENTION

During the large scale, commercial production of certain polymers, a deposition of a polymer skin on reactor walls can occur. This polymer skin can adversely affect heat transfer between the reactor and the cooling system, and ultimately, can impair control of the polymerization reaction and polymer production rates. Once the polymer skin has formed on reactor walls, it may remain on the reactor walls indefinitely, or until such time as the reactor can be opened and the walls cleaned mechanically. A shutdown to clean the polymer skin formation from the reactor walls can be very costly in terms of both manpower and lost production.

It would be beneficial to develop new methods to remove polymer skins from reactor walls and surfaces without having to resort to a complete reactor shutdown, and the associated cost, clean-up, and downtime. Accordingly, it is to this end that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Methods for removing polymer skins from reactor walls in a polymerization reactor system comprising a loop reactor are disclosed herein. One such method can comprise (a) removing some or all of an olefin comonomer from the polymerization reactor system to increase polymer density by at least 0.015 g/cc; and (b) increasing a polymerization temperature of the loop slurry reactor by at least 6° C. (11° F.);

wherein a heat transfer coefficient of the loop slurry reactor increases by at least 28 W/m$^2$/° C. (4.9 BTU/hr/ft$^2$/° F.).

Another method for removing polymer skins from reactor walls in a polymerization reactor system comprising a loop slurry reactor is provided, and in this embodiment, the method can comprise: contacting a catalyst system, an olefin monomer, and an olefin comonomer in the loop slurry reactor under polymerization conditions to produce an olefin copolymer;

(ii) removing some or all of the olefin comonomer to produce an olefin polymer having a density at least 0.015 g/cc higher than the olefin copolymer density; and (iii) increasing a polymerization temperature of the loop slurry reactor by at least 6° C. (11° F.);

wherein a heat transfer coefficient of the loop slurry reactor increases by at least 28 W/m$^2$/° C. (4.9 BTU/hr/ft$^2$/° F.).

Another method for removing polymer skins from reactor walls in a polymerization reactor system comprising a loop slurry reactor is provided, and in this embodiment, the method can comprise:

(I) a first polymerization step comprising contacting a catalyst system, an olefin monomer, and a first olefin comonomer in the loop slurry reactor under first polymerization conditions to produce an olefin copolymer;

(II) a second polymerization step comprising (a) removing some or all of the first olefin comonomer to produce an olefin polymer having a density at least 0.015 g/cc higher than the olefin copolymer density; and (b) increasing a polymerization temperature of the loop slurry reactor by at least 6° C. (11° F.); and (III) a third polymerization step comprising contacting the catalyst system, the olefin monomer, and the first olefin comonomer in the loop slurry reactor under conditions substantially the same as the first polymerization conditions to produce the olefin copolymer;

wherein a heat transfer coefficient of the loop slurry reactor in step (III) is at least 28 W/m$^2$/° C. (4.9 BTU/hr/ft$^2$/° F.) higher than a heat transfer coefficient of the loop slurry reactor in step (I).

Yet, in another embodiment, a method for removing polymer skins from reactor walls in a polymerization reactor system comprising a loop slurry reactor is provided, and in this embodiment, the method can comprise:

(1) contacting a catalyst system, an olefin monomer, and an olefin comonomer in the loop slurry reactor under polymerization conditions to produce an olefin copolymer;

(2) monitoring a process variable in the polymerization reactor system to detect a condition indicative of polymer skin formation on the reactor walls; and (3) in response to the detection of the condition indicative of polymer skin formation on the reactor walls, (a) removing some or all of the olefin comonomer to produce an olefin polymer having a density at least 0.015 g/cc higher than the olefin copolymer density; and (b) increasing a polymerization temperature of the loop slurry reactor by at least 6° C. (11° F.);

wherein the method results in an increase in a heat transfer coefficient of the loop slurry reactor of at least 28 W/m$^2$/° C. (4.9 BTU/hr/ft$^2$/° F.).

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

DEFINITIONS

Figure 1:
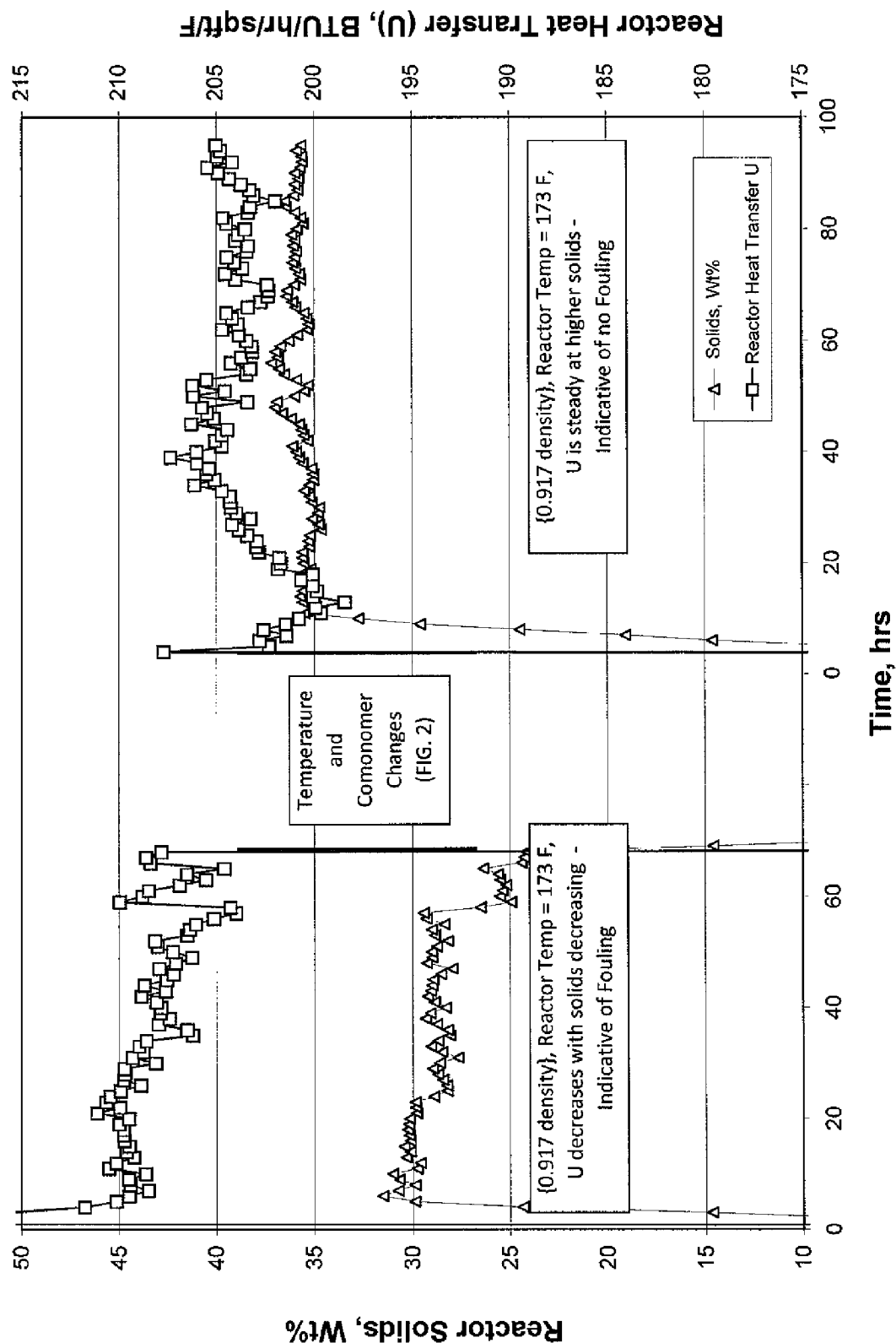
FIG. 1 presents a plot of reactor heat transfer and reactor percent solids versus time, both before and after specific temperature and comonomer changes were made.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system preparation consisting of specific components; alternatively, consisting essentially of specific components; or alternatively, comprising the specific components and other non-recited components.

In this disclosure, while compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "a catalyst system," "an olefin comonomer," etc., is meant to encompass one, or mixtures or combinations of more than one, catalyst system, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials having three or more hydrogen atoms, as necessary for the situation, removed from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that the methods provided herein can result in polymer skin reduction or elimination, and can result in an increase in the heat transfer coefficient of a loop slurry reactor of from 2% to 20% in certain embodiments. By a disclosure that the heat transfer coefficient of the loop slurry reactor can increase in a range from 2% to 20%, Applicants intend to recite that the percentage increase in the heat transfer coefficient can be 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or 20%. Additionally, the percentage increase can be within any range from 2% to 20% (for example, the percentage increase can be in a range from about 3% to about 15%), and this also includes any combination of ranges between 2% and 20%. Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The term "alkane" whenever used in this specification and claims refers to a saturated hydrocarbon compound. Other identifiers can be utilized to indicate the presence of particular groups in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. An "alkane group" is a general term that refers to a group formed by removing one or more hydrogen atoms (as needed for the particular group) from an alkane. An "alkyl group" and "alkane group" can be linear or branched unless otherwise specified. Primary, secondary, and tertiary alkyl groups can be derived by removal of a hydrogen atom from a primary, secondary, and tertiary carbon atom, respectively, of an alkane. The n-alkyl group can be derived by removal of a hydrogen atom from a terminal carbon atom of a linear alkane. The groups $RCH_2$ (R≠H), $R_2CH$ (R H), and $R_3C$ (R≠H) are primary, secondary, and tertiary alkyl groups, respectively. The carbon atom by which indicated moiety is attached is a secondary, tertiary, and quaternary carbon atom, respectively.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

A polymer "skin" is used herein generally to encompass any deposition, build-up, film, fouling, static fouling, sticking, streaking, plate-out, etc., on a reactor wall or reactor surface that may harm or impair any aspect of the polymerization process, e.g., reduced heat transfer, increased circulation pump pressure drop, increased circulation pump power consumption, decreased slurry circulation velocity, or decreased polymer production rate, and the like, as well as combinations thereof. Such polymers skins may form as a result of various polymerization conditions and process upsets known to those of skill in the art. The polymer skin can uniformly coat some portions or all of the reactor walls or surfaces; thus, the polymer skin can be continuous or discontinuous. Moreover, the polymer skin can be non-uniform in thickness or shape, such as being gritty or clumpy in nature, as opposed to a build-up with a substantially uniform thickness.

Reactor "walls" or reactor "surfaces" are used interchangeably herein to encompass any portion of the reactor where a polymer skin may build-up or appear.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are methods for removing polymer skins from reactor walls or surfaces in polymerization reactor systems comprising loop slurry reactors.

Methods for Removing Polymer Skins

Various methods for removing polymers skins from reactor walls in a polymerization reactor system comprising a loop slurry reactor are disclosed and described. In an embodiment, a method for removing polymers skins can comprise (a) removing some or all of an olefin comonomer from the polymerization reactor system to increase polymer density by at least 0.015 g/cc; and (b) increasing a polymerization temperature of the loop slurry reactor by at least 6° C. (11° F.); wherein a heat transfer coefficient of the loop slurry reactor increases by at least 28 $W/m^2/°$ C. (4.9 $BTU/hr/ft^2/°$ F.).

Another method consistent with embodiments disclosed herein for removing polymer skins from reactor walls in a polymerization reactor system comprising a loop slurry reactor can comprise:

(i) contacting a catalyst system, an olefin monomer, and an olefin comonomer in the loop slurry reactor under polymerization conditions to produce an olefin copolymer;

(ii) removing some or all of the olefin comonomer to produce an olefin polymer having a density at least 0.015 g/cc higher than the olefin copolymer density; and (iii) increasing a polymerization temperature of the loop slurry reactor by at least 6° C. (11° F.);

wherein a heat transfer coefficient of the loop slurry reactor increases by at least 28 $W/m^2/°$ C. (4.9 $BTU/hr/ft^2/°$ F.).

In yet another method consistent with embodiments disclosed herein for removing polymer skins from reactor walls in a polymerization reactor system comprising a loop slurry reactor, the method can comprise:

(I) a first polymerization step comprising contacting a catalyst system, an olefin monomer, and a first olefin comonomer in the loop slurry reactor under first polymerization conditions to produce an olefin copolymer;

(II) a second polymerization step comprising (a) removing some or all of the first olefin comonomer to produce an olefin polymer having a density at least 0.015 g/cc higher than the olefin copolymer density; and (b) increasing a polymerization temperature of the loop slurry reactor by at least 6° C. (11° F.); and (III) a third polymerization step comprising contacting the catalyst system, the olefin monomer, and the first olefin comonomer in the loop slurry reactor under conditions substantially the same as the first polymerization conditions to produce the olefin copolymer;

wherein a heat transfer coefficient of the loop slurry reactor in step (III) is at least 28 W/m$^2$/° C. (4.9 BTU/hr/ft$^2$/° F.) higher than a heat transfer coefficient of the loop slurry reactor in step (I).

In still another method consistent with embodiments disclosed herein for removing polymer skins from reactor walls in a polymerization reactor system comprising a loop slurry reactor, the method can comprise:

(1) contacting a catalyst system, an olefin monomer, and an olefin comonomer in the loop slurry reactor under polymerization conditions to produce an olefin copolymer;

(2) monitoring a process variable in the polymerization reactor system to detect a condition indicative of polymer skin formation on the reactor walls; and (3) in response to the detection of the condition indicative of polymer skin formation on the reactor walls, (a) removing some or all of the olefin comonomer to produce an olefin polymer having a density at least 0.015 g/cc higher than the olefin copolymer density; and (b) increasing a polymerization temperature of the loop slurry reactor by at least 6° F.);

wherein the method results in an increase in a heat transfer coefficient of the loop slurry reactor of at least 28 W/m$^2$/° C. (4.9 BTU/hr/ft$^2$/° F.).

Generally, the features of any of the methods disclosed herein (e.g., the catalyst system, the olefin monomer, the olefin comonomer, the polymerization conditions, the olefin copolymer, the olefin polymer, the amount of comonomer removed and the resulting density, the polymerization temperature before and/or after the increase, the amount of resulting heat transfer coefficient increase, the condition indicative of polymer skin formation, among others) are independently described herein, and these features can be combined in any combination to further describe the disclosed methods. Moreover, other process steps can be conducted before, during, and/or after any of the steps listed in the disclosed methods.

In methods provided herein, reactor walls in the polymerization reactor system comprising a loop slurry reactor (one or more) may have some amount of polymer skin formation or build-up, for example, on reactors walls or surfaces of the loop slurry reactor. Unexpectedly, Applicants determined that the combination of both a reduction in comonomer addition (e.g., resulting in an increase in density of the polymer produced) and an increase in polymerization temperature (e.g., reactor temperature in the loop slurry reactor) can remove, either partially or completely, the polymer skin from the reactor walls. The results and/or the effectiveness of this polymer skin removal can be demonstrated by its impact on various process variables typically monitored in a polymerization process, one of which is the heat transfer efficiency between the reactor and the cooling system around the reactor, amongst many other process variables.

In the methods provided herein, the olefin copolymer being produced with polymer skin formation on reactor surfaces that may require removal, often can have a density, prior to the removal of comonomer, of less than 0.935 g/cc, for instance, in a range from 0.875 to 0.930 g/cc, in a range from 0.890 to 0.930 g/cc, or in a range from 0.900 to 0.930 g/cc. More often, the density of the olefin copolymer, prior to removal of comonomer, can be less than 0.928 g/cc; alternatively, less than 0.925 g/cc; alternatively, less than 0.922 g/cc; or alternatively, less than 0.920 g/cc. In one embodiment, the density of the olefin copolymer can be in a range from 0.895 to 0.925 g/cc, such as, for instance, from 0.900 to 0.925 g/cc, or from 0.905 to 0.925 g/cc.

Certain embodiments disclosed herein are directed to the removal of some or all of the olefin comonomer to produce an olefin polymer having a density at least 0.015 g/cc higher than the density of the olefin copolymer. For instance, removing some or all of the comonomer can result in a density increase of at least 0.018 g/cc, at least 0.020 g/cc, at least 0.025 g/cc, at least 0.030 g/cc, or at least 0.035 g/cc. Contemplated ranges of density increases (i.e., density of the olefin polymer, after removal of some or all of the comonomer, minus the density of olefin copolymer) can include, but are not limited to, the following ranges: from 0.015 to 0.060 g/cc, from 0.015 to 0.055 g/cc, from 0.015 to 0.050 g/cc, from 0.015 to 0.045 g/cc, from 0.015 to 0.040 g/cc, from 0.015 to 0.035 g/cc, from 0.020 to 0.060 g/cc, from 0.020 to 0.055 g/cc, from 0.020 to 0.050 g/cc, from 0.020 to 0.045 g/cc, or from 0.020 to 0.040 g/cc, and the like.

In an embodiment, after removing some or all of the comonomer, the olefin polymer can have a density of greater than or equal to 0.935 g/cc. In another embodiment, the olefin polymer density can be greater than or equal to 0.938 g/cc, greater than or equal to 0.940 g/cc, greater than or equal to 0.945 g/cc, greater than or equal to 0.950 g/cc, or greater than or equal to 0.952 g/cc. In yet another embodiment, the olefin polymer can have a density, after removing some or all of the comonomer, in a range from 0.935 g/cc to 0.965 g/cc, from 0.935 to 0.960 g/cc, from 0.935 to 0.955 g/cc, from 0.938 to 0.965 g/cc, from 0.938 to 0.960 g/cc, from 0.940 to 0.965 g/cc, from 0.940 to 0.960 g/cc, or from 0.940 to 0.955 g/cc. Accordingly, it is contemplated that the olefin polymer can an olefin copolymer, or alternatively, an olefin homopolymer (e.g., no comonomer is added to the polymerization reactor, only the olefin monomer).

Methods for removing polymer skins disclosed herein comprise a step of removing some or all of the olefin comonomer to produce an olefin polymer having a density at least 0.015 g/cc higher than the density of the olefin copolymer. In addition, these methods also comprise a step of increasing a polymerization temperature of the reactor by at least 6° C. (11° F.). While not wishing to be bound by theory, Applicants believe that increasing reactor temperature to remove polymer skins runs contrary to the prevailing belief in the art that polymer skin removal may be achieved more effectively at lower reactor or polymerization temperatures.

It is not required that these steps of removing comonomer and increasing polymerization temperature be conducted in any particular order; thus, the step of removing comonomer can be conducted before, during, and/or after the step of increasing polymerization temperature. For example, in one embodiment, the steps of removing olefin comonomer and increasing polymerization temperature can be performed substantially simultaneously. However, in another contemplated embodiment, the steps of removing olefin comonomer and increasing polymerization temperature can be performed sequentially, e.g., some or all of the comonomer can be removed first, such as by reducing the addition rate of comonomer or by stopping the addition of comonomer completely, then the polymerization temperature of the reactor can be increased.

In the methods provided herein, the polymerization conditions under which polymer skins are present on reactor walls, and/or are being deposited on reactor walls, can comprise a polymerization temperature of less than 84° C. (183° F.). More often, the polymerization temperature can be less than 82° C. (180° F.), or less than 79° C. (174° F.). In one embodiment, the polymerization temperature, prior to the increase in polymerization temperature, can be in a range from 70° C. (158° F.) to 84° C. (183° F.), from 70° C. (158° F.) to 82° C. (180° F.), or from 70° C. (158° F.) to 79° C. (174° F.). In another embodiment, the polymerization temperature, prior to the increase in polymerization temperature, can be in a range from 75° C. (167° F.) to 84° C. (183° F.), from 75° C. (167° F.) to 82° C. (180° F.), or from 75° C. (167° F.) to 79° C. (174° F.).

Certain embodiments disclosed herein are directed to increasing a polymerization temperature of the reactor by at least 6° C. (11° F.). For instance, the polymerization temperature can be increased by at least 9° C. (16° F.), at least 10° C. (18° F.), at least 11° C. (20° F.), at least 15° C. (27° F.), at least 17° C. (30° F.), at least 18° C. (32° F.), or at least 20° C. (36° F.). Contemplated ranges of temperature increases (e.g., difference in temperature before and after the increase in polymerization temperature) can include, but are not limited to, the following ranges: from 6° C. (11° F.) to 25° C. (45° F.), from 10° C. (18° F.) to 25° C. (45° F.), from 10° C. (18° F.) to 20° C. (36° F.), or from 6° C. (11° F.) to 20° C. (36° F.), and the like.

In an embodiment, after the step of increasing the polymerization temperature, the polymerization or reactor temperature can be increased to at least 88° C. (190° F.). In another embodiment, the polymerization temperature can be increased to at least 90° C. (194° F.), at least 93° C. (200° F.), or at least 95° C. (203° F.). In yet another embodiment, the polymerization temperature can be, after increasing the temperature, in a range from 90° C. (194° F.) to 110° C. (230° F.), from 88° C. (190° F.) to 105° C. (221° F.), from 88° C. (190° F.) to 100° C. (212° F.), from 88° C. (190° F.) to 95° C. (203° F.), from 90° C. (194° F.) to 105° C. (221° F.), or from 93° C. (200° F.) to 110° C. (230° F.).

Consistent with embodiments disclosed herein, removing polymer skins from reactor walls via the combination of (a) removing some or all of the olefin comonomer, and (b) increasing polymerization temperature, often can result in improved reactor heat transfer, for example, an increase in the heat transfer coefficient of the loop slurry reactor by at least 28 W/m$^2$/° C. (4.9 BTU/hr/ft$^2$/° F.). Hence, the heat transfer efficiency between the reactor and the cooling system surrounding the reactor can be improved. For instance, the heat transfer coefficient can increase by at least 57 W/m$^2$/° C. (10 BTU/hr/ft$^2$/° F.); alternatively, at least 85 W/m$^2$/° C. (15 BTU/hr/ft$^2$/° F.); alternatively, at least 114 W/m$^2$/° C. (20 BTU/hr/ft$^2$/° F.); or alternatively, at least 125 W/m$^2$/° C. (22 BTU/hr/ft$^2$/° F.). Further, Applicants contemplate that increases in the heat transfer coefficient of up to 142 W/m$^2$/° C. (25 BTU/hr/ft$^2$/° F.), or up to 170 W/m$^2$/° C. (30 BTU/hr/ft$^2$/° F.), can be achieved with the methods disclosed herein.

Additionally or alternatively, the increase in the heat transfer coefficient can be described in terms of a percentage increase of the heat transfer coefficient, resulting from polymer skin reduction or elimination. In one embodiment, the heat transfer coefficient of the loop slurry reactor can increase by at least 2%, at least 3%, at least 4%, or at least 5%. In another embodiment, the heat transfer coefficient can increase by at least 6%, at least 8%, or at least 10%. In yet another embodiment, the heat transfer coefficient can increase by a percentage amount in a range from 2% to 20%, from 2% to 15%, from 3% to 15%, from 5% to 15%, from 3% to 20%, from 4% to 15%, or from 5% to 15%.

Another process measurement that can be used to track the reduction in polymer skins is an increase in the ratio of slurry circulation velocity in the loop slurry reactor to circulation pump pressure drop of the loop slurry reactor. Circulation velocity or pump flow can be measured in L/min or gallons/min (GPM), while pump pressure drop (dP or ΔP) can be measured in MPa or psi. With these units, the steps of removing olefin comonomer and increasing polymerization temperature can result in an increase of the ratio of circulation velocity to pump pressure drop of at least 27,450 L/min/MPa (50 gallons/min/psi); alternatively, at least 54,900 L/min/MPa (100 gallons/min/psi); or alternatively, at least 82,350 L/min/MPa (150 gallons/min/psi). For instance, the increase in the ratio of circulation velocity to pump pressure drop can fall within a range from 27,450 L/min/MPa (50 gallons/min/psi) to 192,150 L/min/MPa (350 gallons/min/psi); alternatively, from 27,450 L/min/MPa (50 gallons/min/psi) to 137,250 L/min/MPa (250 gallons/min/psi); alternatively, from 54,900 L/min/MPa (100 gallons/min/psi) to 192,150 L/min/MPa (350 gallons/min/psi); or alternatively, from 54,900 L/min/MPa (100 gallons/min/psi) to 137,250 L/min/MPa (150 gallons/min/psi)

Additionally or alternatively, the increase in the ratio of slurry circulation velocity in the loop slurry reactor to circulation pump pressure drop can be described in terms of a percentage increase of this ratio, resulting from polymer skin reduction or elimination. In one embodiment, the ratio of circulation velocity to pump pressure drop can increase by at least 5%, at least 10%, at least 12%, or at least 15%. In another embodiment, the ratio can increase by at least 17%, at least 20%, at least 25%, or at least 30%. In yet another embodiment, the ratio of circulation velocity to pump pressure drop can increase by a percentage amount in a range from 5% to 50%, from 5% to 40%, from 10% to 50%, from 10% to 40%, from 5% to 35%, from 5% to 30%, or from 10% to 35%.

Another process measurement that can be used to track the reduction in polymer skins is a decrease in the ratio of loop slurry reactor pump power consumption to slurry density in the loop reactor. Circulation pump power consumption can be measured in watts (W) or kilowatts (kW), while slurry density can be measured in g/cc (or g/mL) or lb/ft$^3$. With these units, the steps of removing olefin comonomer and increasing polymerization temperature can result in a decrease in the ratio of pump power to slurry density of at least 31,214 W/g/cc (500 W/lb/ft$^3$); alternatively, at least 62,428 W/g/cc (1000 W/lb/ft$^3$); or alternatively, at least 93,642 W/g/cc (1500 W/lb/ft$^3$). In some embodiments, the decrease in the ratio of reactor pump power to slurry density can fall within a range from 31,214 W/g/cc (500 W/lb/ft$^3$) to 187,284 W/g/cc (3000 W/lb/ft$^3$); alternatively, from 31,214 W/g/cc (500 W/lb/ft$^3$) to 124,856 W/g/cc (2000 W/lb/ft$^3$); alternatively, from 31,214 W/g/cc (500 W/lb/ft$^3$) to 93,642 W/g/cc (1500 W/lb/ft$^3$); or alternatively, from 62,428 W/g/cc (1000 W/lb/ft$^3$) to 187,284 W/g/cc (3000 W/lb/ft$^3$).

Additionally or alternatively, the decrease in the ratio of loop slurry reactor pump power consumption to slurry density in the loop reactor can be described in terms of a percentage decrease of this ratio, resulting from polymer skin reduction or elimination. In one embodiment, the ratio of pump power to loop slurry density can decrease by at least 2%, at least 3%, at least 4%, or at least 5%. In another embodiment, the ratio can decrease by at least 6%, at least 8%, or at least 10%. In yet another embodiment, ratio can decrease by a percentage amount in a range from 2% to 20%, from 2% to 15%, from 3% to 15%, from 5% to 15%, from 3% to 20%, from 4% to 15%, or from 5% to 15%.

In embodiments of the methods disclosed herein, it may be beneficial for the conditions of reduced comonomer (and, subsequently, increased polymer density) and increased polymerization temperature to be maintained for a long duration of time to reduce or eliminate the polymer skin formation from the reactor walls. Depending upon the extent of the polymer skin build-up, amongst other variables, these conditions of increased density and increased temperature can be maintained for at least 24 hours, or for at least 48 hours. In some embodiments, the conditions of increased density and increased temperature can be maintained for at least 3 days, at least 4 days, at least 5 days, or at least 7 days, while in other embodiments, the conditions of increased density and increased temperature can be maintained for a time period in a range of from 1 to 30 days or more, from 2 to 30 days or more, from 4 to 30 days or more, from 1 to 21 days, from 2 to 21 days, from 4 to 21 days, or from 7 to 28 days.

The methods disclosed herein are applicable to reactor walls (or surfaces) constructed of any suitable materials. For instance, the composition of the reactor walls may comprise carbon steel, stainless steel, carbon steel with stainless steel cladding, and the like, or combinations thereof. Moreover, the reactor wall may be smooth or rough (e.g., a matte surface), and have any suitable coefficient of friction (COF).

In an embodiment, a method for removing polymer skins from reactor walls in a polymerization reactor system comprising a loop slurry reactor can comprise (a) removing some or all of an olefin comonomer from the polymerization reactor system to increase polymer density by at least 0.015 g/cc; and (b) increasing a polymerization temperature of the loop slurry reactor by at least 6° C. (11° F.); wherein a heat transfer coefficient of the loop slurry reactor increases by at least 28 W/m$^2$/° C. (4.9 BTU/hr/ft$^2$/° F.). Additionally, this method can further comprise monitoring a process variable to detect an undesired condition in the polymerization reactor system, and when the undesired condition has reached a predetermined critical level, performing step (a) and step (b).

In another embodiment, a method for removing polymer skins from reactor walls in a polymerization reactor system comprising a loop slurry reactor can comprise (i) contacting a catalyst system, an olefin monomer, and an olefin comonomer in the loop slurry reactor under polymerization conditions to produce an olefin copolymer; (ii) removing some or all of the olefin comonomer to produce an olefin polymer having a density at least 0.015 g/cc higher than the olefin copolymer density; and (iii) increasing a polymerization temperature of the loop slurry reactor by at least 6° C. (11° F.); wherein a heat transfer coefficient of the loop slurry reactor increases by at least 28 W/m$^2$/° C. (4.9 BTU/hr/ft$^2$/° F.). Additionally, this method can further comprise monitoring a process variable to detect an undesired condition in the polymerization reactor system, and when the undesired condition has reached a predetermined critical level, performing step (ii) and step (iii).

In yet another embodiment, a method for removing polymer skins from reactor walls in a polymerization reactor system comprising a loop slurry reactor can comprise (I) a first polymerization step comprising contacting a catalyst system, an olefin monomer, and a first olefin comonomer in the loop slurry reactor under first polymerization conditions to produce an olefin copolymer; (II) a second polymerization step comprising (a) removing some or all of the first olefin comonomer to produce an olefin polymer having a density at least 0.015 g/cc higher than the olefin copolymer density; and (b) increasing a polymerization temperature of the loop slurry reactor by at least 6° C. (11° F.); and (III) a third polymerization step comprising contacting the catalyst system, the olefin monomer, and the first olefin comonomer in the loop slurry reactor under conditions substantially the same as the first polymerization conditions to produce the olefin copolymer; wherein a heat transfer coefficient of the loop slurry reactor in step (III) is at least 28 W/m$^2$/° C. (4.9 BTU/hr/ft$^2$/° F.) higher than a heat transfer coefficient of the loop slurry reactor in step (I). Additionally, this method can further comprise monitoring a process variable to detect an undesired condition in the polymerization reactor system, and when the undesired condition has reached a predetermined critical level, performing step (II)(a) and step (II)(b).

In these and other embodiments, the process variable can include, for example, reactor heat transfer coefficient, slurry circulation velocity in the reactor, circulation pump pressure drop in the reactor, reactor pump power consumption, slurry density, weight percent solids, and the like, or a combination of any of these variables; and the undesired condition can include, for example, a decrease in heat transfer coefficient, a decrease in circulation velocity, an increase in pump pressure drop, an increase in pump power consumption, and the like, or a combination of any of these conditions. Often, the undesired conditions of decreasing heat transfer coefficient, decreasing circulation velocity, increasing pump pressure drop, and/or increasing pump power can be evaluated as a function of the slurry density and/or the weight percent solids in the reactor, or at a constant slurry density and/or weight percent solids. The predetermined critical level can be ascertained by one of skill in the art depending upon, for instance, the historic and the prevailing conditions in the polymerization reactor system. As non-limiting examples, a predetermined critical level may be a decrease of a certain percentage (above a percentage that is deemed allowable during normal operation) of the heat transfer coefficient at decreasing solids content, and/or an increase of a certain percentage (above a percentage that is deemed allowable during normal operation) of pump ΔP at constant or reduced circulation velocity, and/or an increase of a certain percentage (above a percentage that is deemed allowable during normal operation) of pump power consumption at constant or decreasing slurry density.

Certain embodiments described herein are directed to methods for removing polymer skins from reactor walls, in a polymerization reactor system comprising a loop slurry reactor, which can comprise at least the following steps: (I) a first polymerization step comprising contacting a catalyst system, an olefin monomer, and a first olefin comonomer in the loop slurry reactor under first polymerization conditions to produce an olefin copolymer; (II) a second polymerization step comprising (a) removing some or all of the first olefin comonomer to produce an olefin polymer having a density at least 0.015 g/cc higher than the olefin copolymer density; and (b) increasing a polymerization temperature of the loop slurry reactor by at least 6° C. (11° F.); and (III) a third polymerization step comprising contacting the catalyst system, the olefin monomer, and the first olefin comonomer in the loop slurry reactor under conditions substantially the same as the first polymerization conditions to produce the olefin copolymer; wherein a heat transfer coefficient of the loop slurry reactor in step (III) is at least 28 W/m$^2$/° C. (4.9 BTU/hr/ft$^2$/° F.) higher than a heat transfer coefficient of the loop slurry reactor in step (I). As one of skill in the art would recognize, many other steps can be present in addition to steps (I), (II), and (III). For instance, the first step can be directed to the production of an olefin copolymer having a density of less than 0.925, or less than 0.920. Due to polymer film formation or build-up that may be present during the production of such olefin copolymer, a second step may be undertaken to reduce or eliminate the polymer skins, and this step can include removing some/all of the olefin comonomer (resulting in an olefin polymer having a density at least 0.015 g/cc higher than that of the olefin copolymer), and increasing the polymerization temperature in the loop slurry reactor by at least 6° C. (11° F.). At these conditions of higher density and higher reactor temperature, one or more grades of olefin polymer(s) can be produced, such as, for example, a 0.940 density polymer (with targeted molecular weight and/or melt flow properties), followed by a 0.950 density polymer (with targeted molecular weight and/or melt flow properties), and so forth. Thus, either one or a campaign of many higher density olefin polymers, under conditions of higher reactor temperatures, can be produced prior to returning to the production of the original olefin copolymer.

In the third polymerization step, the olefin copolymer is produced under conditions substantially the same as the first polymerization conditions in the first polymerization step, but due to the reduction or elimination of polymer skins, various undesirable conditions in the polymerization reactor, such as impaired heat transfer, have improved. As it pertains to this method of removing polymer skins, "conditions substantially the same as the first polymerization conditions" is intended to include any variations in process conditions that would still permit the olefin copolymer in step (III) to fall within the same production specifications (e.g., melt index, density, etc., for a particular copolymer grade) as that for the olefin copolymer in step (I). Hence, the polymerization conditions in steps (I) and (III) need not be exactly the same or identical. In an embodiment, it is contemplated that the effectiveness of removing polymers skins can demonstrated from a comparison of the respective heat transfer coefficients in steps (I) and (III), when measured at the same polymerization temperature and weight percent solids.

In another embodiment, a method for removing polymer skins from reactor walls in a polymerization reactor system comprising a loop slurry reactor can comprise (1) contacting a catalyst system, an olefin monomer, and an olefin comonomer in the loop slurry reactor under polymerization conditions to produce an olefin copolymer; (2) monitoring a process variable in the polymerization reactor system to detect a condition indicative of polymer skin formation on the reactor walls; and (3) in response to the detection of the condition indicative of polymer skin formation on the reactor walls, (a) removing some or all of the olefin comonomer to produce an olefin polymer having a density at least 0.015 g/cc higher than the olefin copolymer density; and (b) increasing a polymerization temperature of the loop slurry reactor by at least 6° C. (11° F.); wherein the method results in an increase in a heat transfer coefficient of the loop slurry reactor of at least 28 W/m$^2$/° C. (4.9 BTU/hr/ft$^2$/° F.). In this embodiment, the process variable can include, for example, reactor heat transfer coefficient, slurry circulation velocity, circulation pump pressure drop, reactor pump power consumption, slurry density, weight percent solids, and the like, or a combination of any of these variables; and the condition indicative of polymer skin formation can include, for example, a decrease in heat transfer coefficient, a decrease in circulation velocity, an increase in pump pressure drop, an increase in pump power, and the like, or a combination of any of these conditions. Often, the conditions of decreasing heat transfer coefficient, decreasing circulation velocity, increasing pump pressure drop, and/or increasing pump power consumption can be evaluated as a function of the slurry density and/or the weight percent solids in the reactor, or at a constant slurry density and/or weight percent solids. In response to detecting one or more conditions that indicate there is polymer skin formation on the reactor walls, the steps to remove or eliminate the polymer skins then can be conducted: e.g., removing some or all of the olefin comonomer to produce an olefin polymer having a density at least 0.015 g/cc higher than the olefin copolymer density, and increasing a polymerization temperature of the loop slurry reactor by at least 6° C. (11° F.).

In the methods disclosed herein, a catalyst system, an olefin monomer, and an olefin comonomer can be contacted in a loop slurry reactor under polymerization conditions. As would be recognized by one of skill in the art, additional components can be introduced or added into the reactor and contacted with the catalyst system, the olefin monomer, and the olefin comonomer, and such unrecited components are encompassed herein. For instance, in the operation of a polymerization reactor system—depending, of course, on the desired olefin copolymer, among other factors—solvents and/or diluents, recycle streams, hydrogen, etc., also can be present in the loop reactor and/or polymerization reactor system.

Catalyst Systems

The methods disclosed herein are not limited to any particular catalyst system (e.g., any transition metal-based catalyst system) suitable for the polymerization of an olefin monomer. The catalyst system can comprise, for example, a transition metal (one or more than one) from Groups IIIB-VIIIB of the Periodic Table of the Elements. In one embodiment, the catalyst system can comprise a Group III, IV, V, or VI transition metal, or a combination of two or more transition metals. The catalyst system can comprise chromium, titanium, zirconium, hafnium, vanadium, or a combination thereof, in some embodiments, or can comprise chromium, titanium, zirconium, hafnium, or a combination thereof, in other embodiments. Accordingly, the catalyst system can comprise chromium, or titanium, or zirconium, or hafnium, either singly or in combination. Thus, catalyst systems comprising two or more transition metal compounds, wherein each transition metal compound independently can comprise chromium, titanium, zirconium, hafnium, vanadium, or a combination thereof, are contemplated and encompassed herein.

Various catalyst systems known to a skilled artisan are useful in the polymerization of olefins. These include, but are not limited to, Ziegler-based catalyst systems, chromium-based catalyst systems, metallocene-based catalyst systems, and the like, including combinations thereof. The methods disclosed herein are not limited to the aforementioned catalyst systems, but Applicants nevertheless contemplate particular embodiments directed to these catalyst systems. Hence, the catalyst system can be a Ziegler-based catalyst system, a chromium-based catalyst system, and/or a metallocene-based catalyst system; alternatively, a Ziegler-based catalyst system; alternatively, a chromium-based catalyst system; or alternatively, a metallocene-based catalyst system. In one embodiment, the catalyst system can be a dual catalyst system comprising at least one metallocene compound, while in another embodiment, the catalyst system can be a dual catalyst system comprising two different metallocene compounds.

Examples of representative and non-limiting catalyst systems include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 3,887,494, 3,900,457, 4,053,436, 4,081,407, 4,296,001, 4,392,990, 4,405,501, 4,981,831, 4,151,122, 4,247,421, 4,248,735, 4,297,460, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,887,494, 3,119,569, 3,900,457, 4,981,831, 4,364,842, 4,444,965, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

In some embodiments, the catalyst system can comprise, in addition to a transition metal compound, an activator and/or a co-catalyst. Illustrative activators can include, but are not limited to, aluminoxane compounds, organoboron or organoborate compounds, ionizing ionic compounds, activator-supports (a solid oxide treated with an electron-withdrawing anion), and the like, or combinations thereof. Commonly used polymerization co-catalysts can include, but are not limited to, metal alkyl, or organometal, co-catalysts, with the metal encompassing boron, aluminum, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, triethylaluminum, triisobutylaluminum, diethylaluminum chloride, and the like, including combinations thereof.

Olefin Monomers and Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal (a), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{20}$ olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer. According to one embodiment, the olefin monomer in the polymerization process can comprise ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another embodiment, the olefin monomer can comprise ethylene and the olefin comonomer can comprise an α-olefin, while in yet another embodiment, the comonomer can comprise 1-butene, 1-pentene, 1-hexene, 1-octene, 1-decene, styrene, or any combination thereof; or alternatively, the olefin comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, ethylene/1-octene, etc.), a propylene copolymer, an ethylene terpolymer, a propylene terpolymer, and the like, including combinations thereof.

Polymerization Reactor Systems

The disclosed methods are intended for any olefin polymerization process using various types of polymerization reactors, polymerization reactor systems, and polymerization reaction conditions, provided that at least one loop slurry reactor is present in the polymerization reactor system. Generally, a polymerization reactor is capable of polymerizing (inclusive of oligomerizing) olefin monomers and optional comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes could use intermittent or continuous product discharge. Polymerization reactor systems and processes also can include partial or full direct recycle of unreacted monomer, unreacted comonomer, and/or diluent.

A polymerization reactor system can comprise one type of reactor or multiple reactors of the same or different type, e.g., two or more reactors, operated in series, in parallel, or both. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. For instance, the polymerization reactor system can comprise two loop slurry reactors in series, a loop slurry reactor and a gas phase reactor (e.g., a fluidized bed reactor), a loop slurry reactor and a solution reactor, a loop slurry reactor and a high pressure reactor, and the like.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.).

Polymerization conditions that can be monitored and controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor, the polymer grade, and so forth. In some reactor systems, the polymerization temperature generally can be within a range from about 70° C. to about 105° C., or from about 75° C. to about 100° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

A large scale experimental trial was conducted to determine the impact of a combination of increasing density (removal of comonomer) and increasing polymerization temperature on removing polymer skins from reactor walls in a loop slurry reactor.

Figure 3:
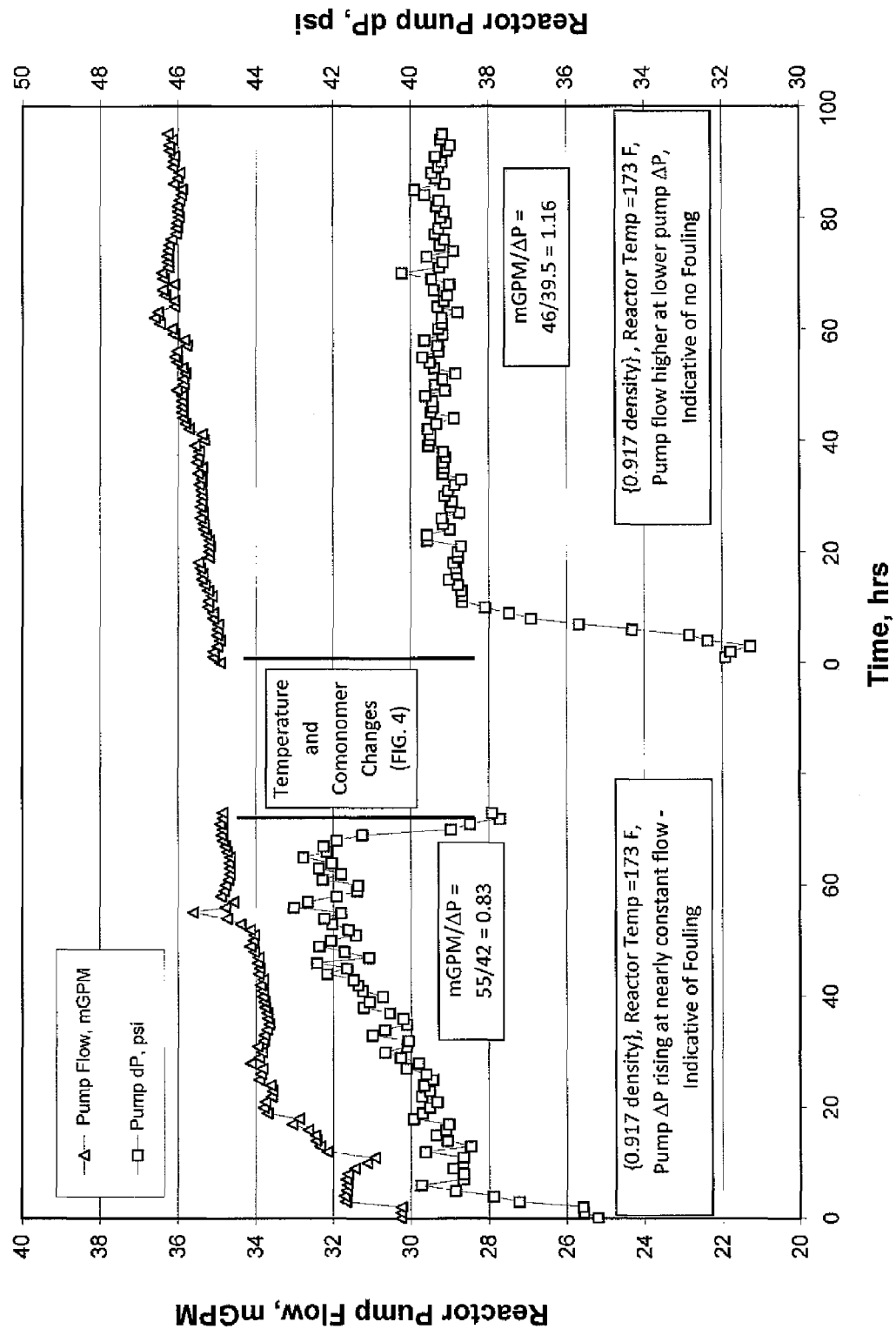
FIG. 3 presents a plot of reactor circulation pump flow (or circulation velocity) and circulation pump pressure drop versus time, both before and after specific temperature and comonomer changes were made.
Figure 5:
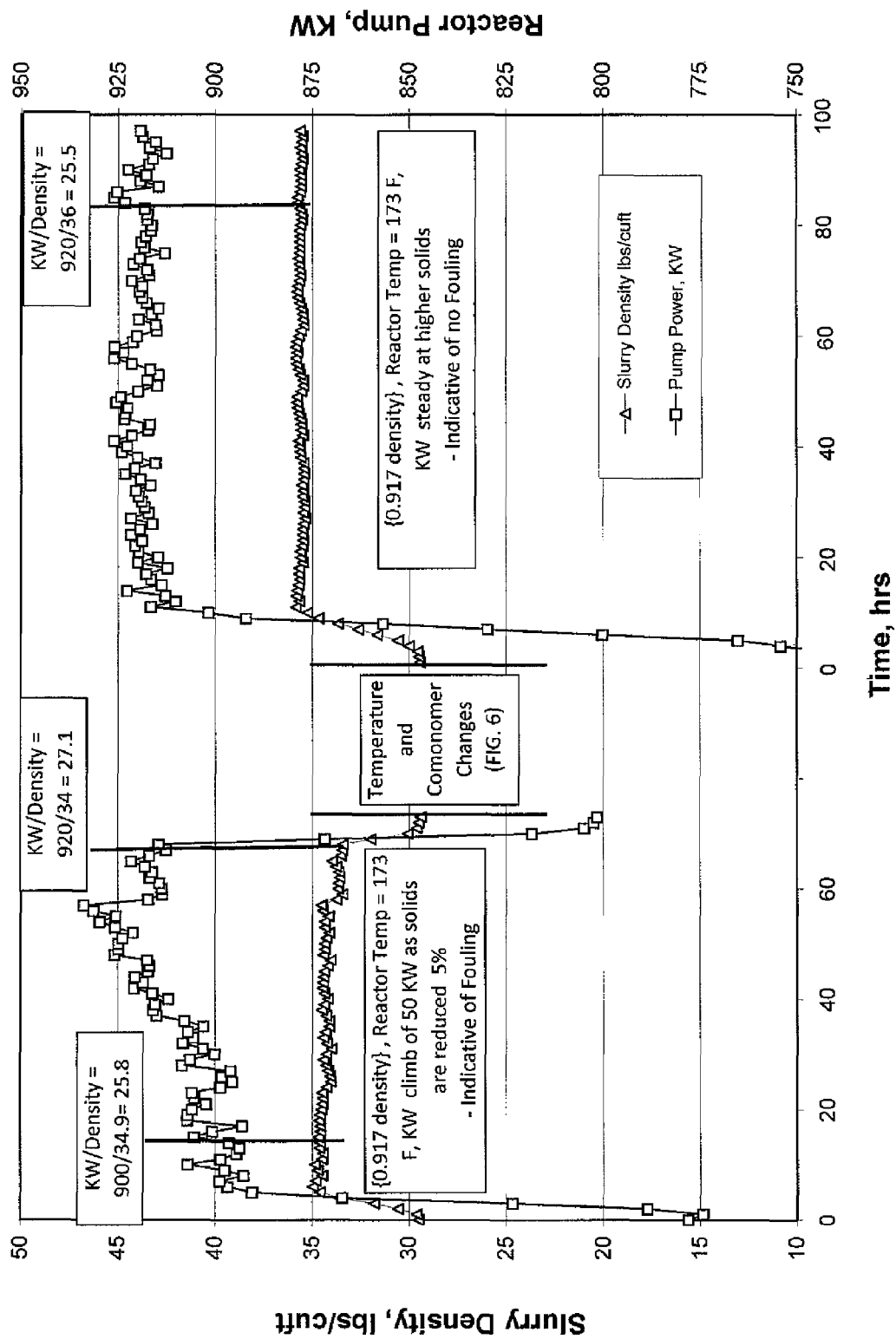
FIG. 5 presents a plot of reactor circulation pump power consumption and slurry density versus time, both before and after specific temperature and comonomer changes were made.

Referring to FIGS. 1, 3, and 5, an ethylene/1-hexene copolymer having a nominal 0.917 g/cc density was produced. The catalyst composition was a metallocene-based catalyst composition comprising about 3.5-4 wt. % of a metallocene compound on a solid acid activator. The reactor size was about 27,000 gal (102,000 L), the reactor temperature was about 173° F. (78° C.), the reactor pressure was about 600 psig (4.1 MPa), and the ethylene percent was in the 5-6 wt. % range. Hydrogen was added as needed to affect the desired molecular weight and/or melt index of the copolymer. Continuous production of the 0.917 g/cc density copolymer was conducted for over 60 hours. During this time period, fouling or polymer skin formation on the reactor walls was evident: In FIG. 1, the heat transfer coefficient decreased under conditions of decreasing solids; in FIG. 3, the circulation pump ΔP increased at relatively constant slurry flow (in thousand of gallons per minute—mGPM); and in FIG. 5, the circulation pump power consumption increased as slurry density decreased.

After about 70 hours, the production of the nominal 0.917 density copolymer was discontinued, and a series of temperature and comonomer changes were made in an effort to reduce or eliminate the polymer skin formation on the reactor walls.

Figure 2:
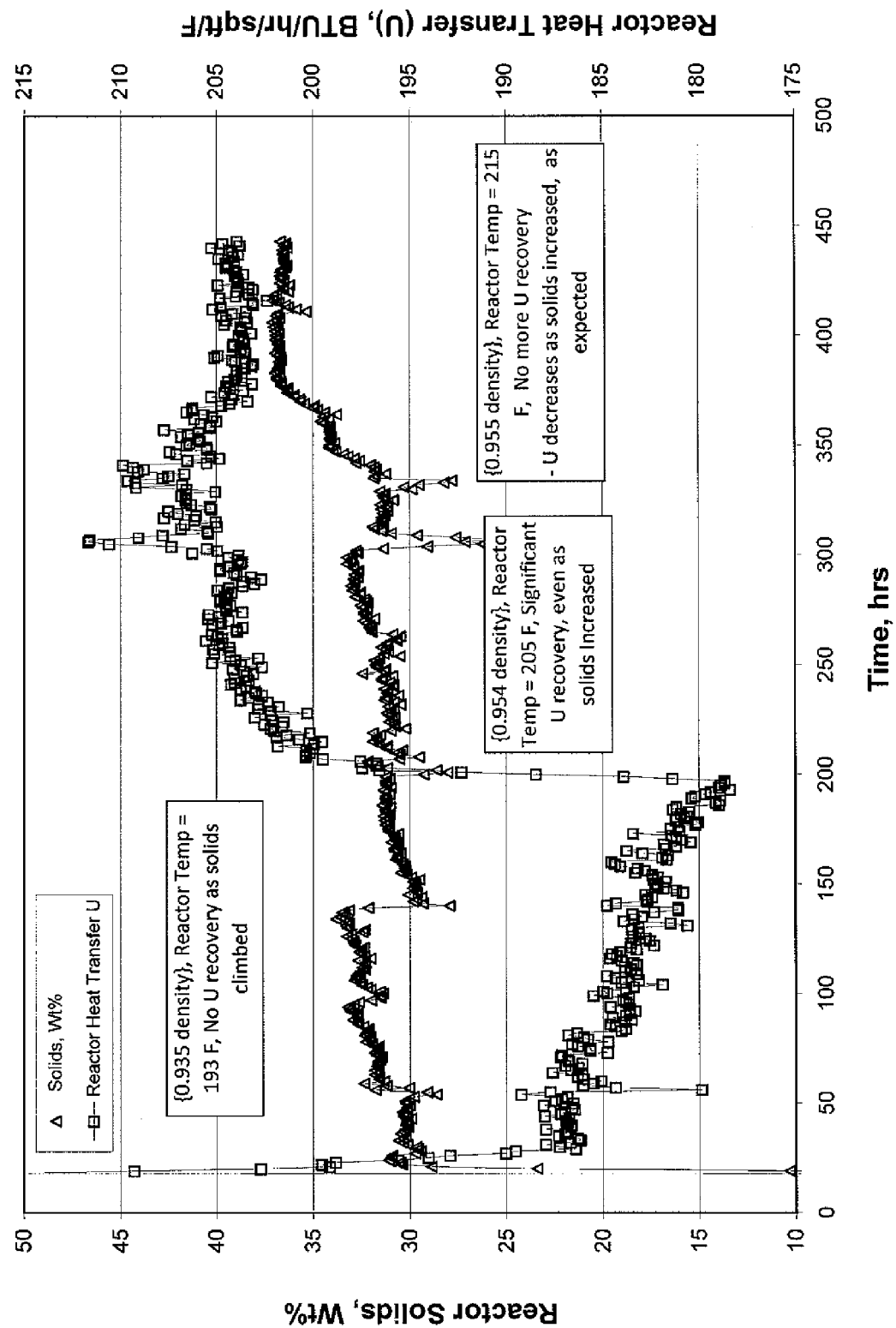
FIG. 2 presents a plot of reactor heat transfer and reactor percent solids versus time for certain density and temperature changes to the reactor.
Figure 4:
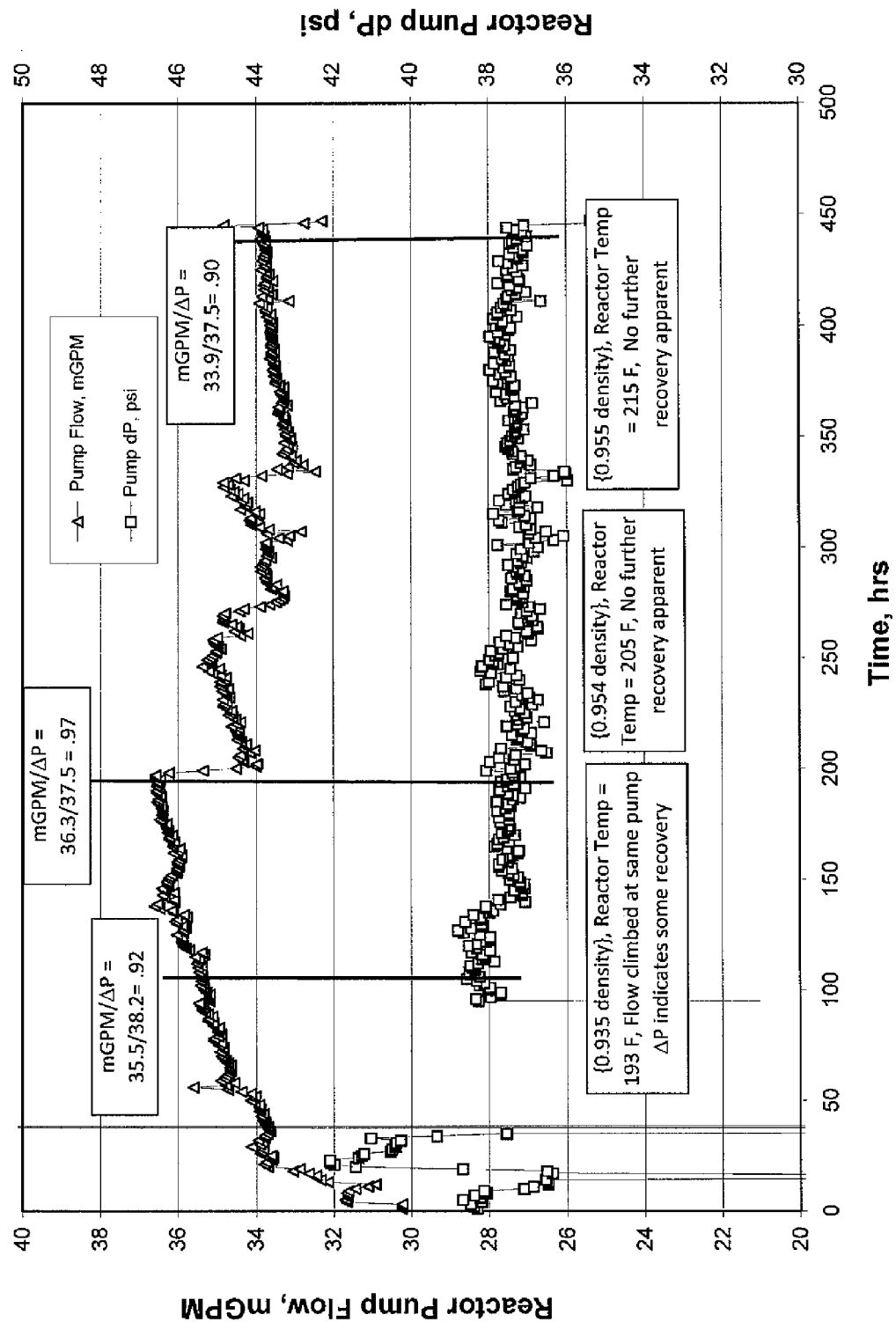
FIG. 4 presents a plot of reactor circulation pump flow (or circulation velocity) and circulation pump pressure drop versus time for certain density and temperature changes to the reactor.
Figure 6:
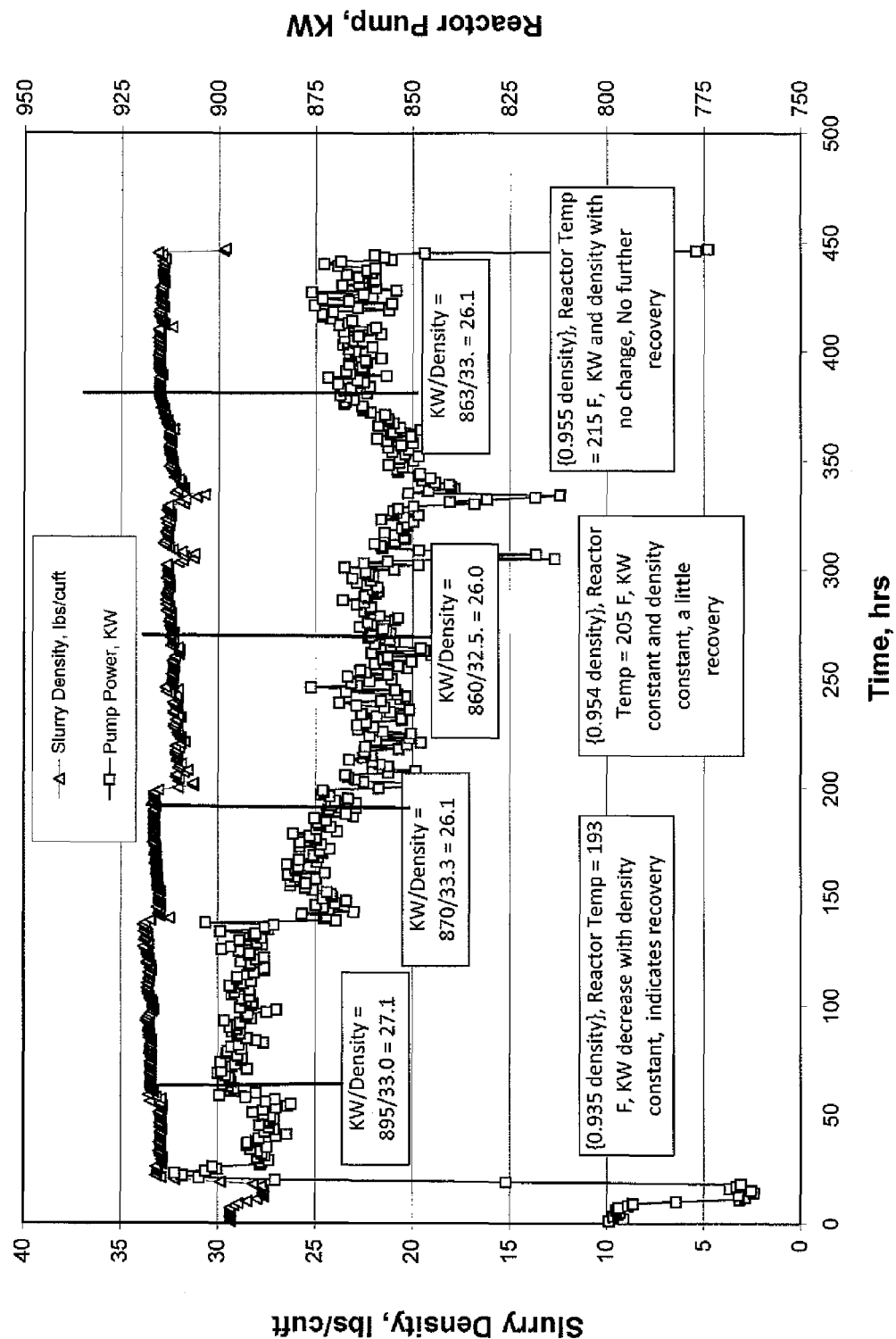
FIG. 6 presents a plot of reactor circulation pump power consumption and slurry density versus time for certain density and temperature changes to the reactor.

Referring to FIGS. 2, 4, and 6, ethylene/1-hexene copolymers having nominal 0.935, 0.954, and 0.955 g/cc densities were produced, at respective reactor temperatures of about 193° F. (90° C.), 205° F. (96° C.), and 215° F. (102° C.). The catalyst compositions were either a Cr/silica-titania catalyst or a Cr/silica catalyst. The reactor pressure was about 600 psig (4.1 MPa), and the ethylene wt. % percent was in the 4.5 to 6% range. Hydrogen was added as needed to affect the desired molecular weight and/or melt index of the respective copolymers. Continuous production of the 0.935 g/cc density copolymer was conducted for about 200 hours, the 0.954 density copolymer for about 100 hours, and the 0.955 density copolymer for about 150 hours. During these time periods, reduction of fouling or polymer skin formation on the reactor walls was evident: In FIG. 2, the heat transfer coefficient increased under conditions of increasing solids; in FIG. 4, slurry flow or circulation velocity increased at relatively constant pump ΔP; and in FIG. 6, the circulation pump power consumption decreased at a constant slurry density.

Returning now to FIGS. 1, 3, and 5, after these temperature and comonomer changes, the same ethylene/1-hexene copolymer having a nominal 0.917 g/cc density was again produced for about 100 hours. During this time period, the previously noted polymer skin formation was reduced and/or eliminated, resulting in the following improvements as compared to the conditions prior to the temperature and comonomer changes: In FIG. 1, the heat transfer coefficient was steady at a much higher solids content; in FIG. 3, the slurry flow or circulation velocity was higher at a lower pump ΔP; and in FIG. 5, the circulation pump power consumption was steady at a higher slurry density.

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1

A method for removing polymer skins from reactor walls in a polymerization reactor system comprising a loop slurry reactor, the method comprising:

(i) contacting a catalyst system, an olefin monomer, and an olefin comonomer in the loop slurry reactor under polymerization conditions to produce an olefin copolymer;

(ii) removing some or all of the olefin comonomer to produce an olefin polymer having a density at least 0.015 g/cc higher than the olefin copolymer density; and (iii) increasing a polymerization temperature of the loop slurry reactor by at least 6° C. (11° F.);

wherein a heat transfer coefficient of the loop slurry reactor increases by at least 28 W/m$^2$/° C. (4.9 BTU/hr/ft$^2$/° F.).

Embodiment 2

A method for removing polymer skins from reactor walls in a polymerization reactor system comprising a loop slurry reactor, the method comprising:

(I) a first polymerization step comprising contacting a catalyst system, an olefin monomer, and a first olefin comonomer in the loop slurry reactor under first polymerization conditions to produce an olefin copolymer;

(II) a second polymerization step comprising (a) removing some or all of the first olefin comonomer to produce an olefin polymer having a density at least 0.015 g/cc higher than the olefin copolymer density; and (b) increasing a polymerization temperature of the loop slurry reactor by at least 6° C. (11° F.); and (III) a third polymerization step comprising contacting the catalyst system, the olefin monomer, and the first olefin comonomer in the loop slurry reactor under conditions substantially the same as the first polymerization conditions to produce the olefin copolymer;

wherein a heat transfer coefficient of the loop slurry reactor in step (III) is at least 28 W/m$^2$/° C. (4.9 BTU/hr/ft$^2$/° F.) higher than a heat transfer coefficient of the loop slurry reactor in step (I).

Embodiment 3

A method for removing polymer skins from reactor walls in a polymerization reactor system comprising a loop slurry reactor, the method comprising:

(a) removing some or all of an olefin comonomer from the polymerization reactor system to increase polymer density by at least 0.015 g/cc; and (b) increasing a polymerization temperature of the loop slurry reactor by at least 6° C. (11° F.);

wherein a heat transfer coefficient of the loop slurry reactor increases by at least 28 W/m$^2$/° C. (4.9 BTU/hr/ft$^2$/° F.).

Embodiment 4

The method defined in any of the preceding embodiments, wherein the method further comprises monitoring a process variable to detect an undesired condition in the polymerization reactor system, and when the undesired condition has reached a predetermined critical level, performing the steps of removing olefin comonomer and increasing polymerization temperature.

Embodiment 5

A method for removing polymer skins from reactor walls in a polymerization reactor system comprising a loop slurry reactor, the method comprising:

(1) contacting a catalyst system, an olefin monomer, and an olefin comonomer in the loop slurry reactor under polymerization conditions to produce an olefin copolymer;

(2) monitoring a process variable in the polymerization reactor system to detect a condition indicative of polymer skin formation on the reactor walls; and (3) in response to the detection of the condition indicative of polymer skin formation on the reactor walls, (a) removing some or all of the olefin comonomer to produce an olefin polymer having a density at least 0.015 g/cc higher than the olefin copolymer density; and (b) increasing a polymerization temperature of the loop slurry reactor by at least 6° C. (11° F.);

wherein the method results in an increase in a heat transfer coefficient of the loop slurry reactor of at least 28 W/m$^2$/° C. (4.9 BTU/hr/ft$^2$/° F.).

Embodiment 6

The method defined in embodiments 4-5, wherein the undesired condition (or condition indicative of polymer skin formation) comprises, at constant loop slurry reactor density, a decrease in heat transfer coefficient, a decrease in circulation velocity, an increase in pump pressure drop, an increase in pump power consumption, or any combination thereof.

Embodiment 7

The method defined in any of the preceding embodiments, wherein the heat transfer coefficient increases by any amount/range disclosed herein, for example, by at least 57 W/m$^2$/° C. (10 BTU/hr/ft$^2$/° F.), or by at least 114 W/m$^2$/° C. (20 BTU/hr/ft$^2$/° F.).

Embodiment 8

The method defined in any of the preceding embodiments, wherein the heat transfer coefficient increases by any percentage amount/range disclosed herein, for example, by at least 5%, or by at least 10%.

Embodiment 9

The method defined in any of the preceding embodiments, wherein the steps of removing olefin comonomer and increasing polymerization temperature of the preceding embodiments result in a ratio of circulation velocity (in L/min or gallons/min) in the loop slurry reactor to pump pressure drop (in MPa or psi) of the loop slurry reactor increase of any amount/range disclosed herein, for example, of at least 27,450 L/min/MPa (50 gallons/min/psi), or at least 54,900 L/min/MPa (100 gallons/min/psi).

Embodiment 10

The method defined in any of the preceding embodiments, wherein the steps of removing olefin comonomer and increasing polymerization temperature of the preceding embodiments result in a ratio of circulation velocity in the loop slurry reactor to pump pressure drop of the loop slurry reactor increase of any percentage amount/range disclosed herein, for example, of at least 10%, or at least 20%.

Embodiment 11

The method defined in any of the preceding embodiments, wherein the steps of removing olefin comonomer and increasing polymerization temperature of the preceding embodiments result in a ratio of loop slurry reactor pump power consumption (in watts) to slurry density (in g/cc or g/mL, or lb/ft$^3$) in the loop reactor decrease of any amount/range disclosed herein, for example, of at least 31,214 W/g/cc (500 W/lb/ft$^3$), or at least 62,428 W/g/cc (1000 W/lb/ft$^3$).

Embodiment 12

The method defined in any of the preceding embodiments, wherein the steps of removing olefin comonomer and increasing polymerization temperature of the preceding embodiments result in a ratio of loop slurry reactor pump power consumption to slurry density in the loop reactor decrease of any percentage amount/range disclosed herein, for example, of at least 5%, or at least 10%.

Embodiment 13

The method defined in any of the preceding embodiments, wherein the polymerization temperature increases by any amount/range disclosed herein, for example, by at least 11° C. (20° F.), or by at least 17° C. (30° F.).

Embodiment 14

The method defined in any of the preceding embodiments, wherein a polymerization temperature, prior to the increase in polymerization temperature, is less than any temperature or in any range disclosed herein, for example, less than 82° C. (180° F.), or less than 79° C. (174° F.).

Embodiment 15

The method defined in any of the preceding embodiments, wherein a polymerization temperature, after the increase in polymerization temperature, is greater than any temperature or in any range disclosed herein, for example, at least 88° C. (190° F.), at least 90° C. (194° F.), or at least 93° C. (200° F.).

Embodiment 16

The method defined in any of the preceding embodiments, wherein the removal of comonomer results in a density increase of any amount/range disclosed herein, for example, of at least 0.020 g/cc, or at least 0.030 g/cc.

Embodiment 17

The method defined in any of the preceding embodiments, wherein an olefin copolymer density, prior to the removal of comonomer, is less than any density or in any range disclosed herein, for example, less than 0.935 g/cc, less than 0.925 g/cc, or less than 0.920 g/cc.

Embodiment 18

The method defined in any of the preceding embodiments, wherein an olefin polymer density, after the removal of comonomer, is greater than or equal to any density or in any range disclosed herein, for example, greater than or equal to 0.935 g/cc, greater than or equal to 0.945 g/cc, or greater than or equal to 0.950 g/cc.

Embodiment 19

The method defined in any of the preceding embodiments, wherein the conditions of increased density and increased temperature are maintained for any time period/range disclosed herein, for example, at least 48 hours, at least 3 days, at least 4 days, or at least 5 days.

Embodiment 20

The method defined in any of the preceding embodiments, wherein the steps of removing olefin comonomer and increasing polymerization temperature are performed substantially simultaneously, or alternatively, are performed sequentially.

Embodiment 21

The method defined in any of the preceding embodiments, wherein the catalyst system comprises chromium, vanadium, titanium, zirconium, hafnium, or a combination thereof.

Embodiment 22

The method defined in any of the preceding embodiments, wherein the catalyst system is a chromium-based catalyst system, a Ziegler-based catalyst system, a metallocene-based catalyst system, or a combination thereof.

Embodiment 23

The method defined in any of the preceding embodiments, wherein the catalyst system is a metallocene-based catalyst system.

Embodiment 24

The method defined in any of the preceding embodiments, wherein the catalyst system is a dual catalyst system comprising at least one metallocene compound.

Embodiment 25

The method defined in any of the preceding embodiments, wherein the catalyst system is a dual catalyst system comprising two different metallocene compounds.

Embodiment 26

The method defined in any of the preceding embodiments, wherein the olefin monomer comprises ethylene.

Embodiment 27

The method defined in any of the preceding embodiments, wherein the olefin comonomer comprises 1-butene, 1-hexene, 1-octene, or combination thereof.

We claim:

1. A method for removing polymer skins from reactor walls in a polymerization reactor system comprising a loop slurry reactor, the method comprising:
    (1) contacting a catalyst system, an olefin monomer, and an olefin comonomer in the loop slurry reactor under polymerization conditions to produce an olefin copolymer;
    (2) monitoring a process variable in the polymerization reactor system to detect a condition indicative of polymer skin formation on the reactor walls, wherein the condition indicative of polymer skin formation comprises a decrease in heat transfer coefficient, a decrease in slurry circulation velocity, an increase in circulation pump pressure drop, an increase in pump power consumption, or any combination thereof; and
    (3) in response to the detection of the condition indicative of polymer skin formation on the reactor walls, (a) removing some or all of the olefin comonomer to produce an olefin polymer having a density at least 0.015 g/cc higher than the olefin copolymer density; and (b) increasing a polymerization temperature of the loop slurry reactor by at least 6° C. (11° F.);
    wherein the method results in an increase in a heat transfer coefficient of the loop slurry reactor of at least 28 $W/m^2/°C$. (4.9 $BTU/hr/ft^2/°F$.).

2. The method of claim 1, wherein:
    the polymerization conditions in step (1) comprise a polymerization temperature of less than 82° C. (180° F.);
    the polymerization temperature of the loop slurry reactor in step (3) increases to at least 88° C. (190° F.);
    the polymerization temperature of the loop slurry reactor increases by at least 11° C. (20° F.);
    or any combination thereof.

3. The method of claim 1, wherein:
    the olefin copolymer density is less than 0.925 g/cc;
    the olefin polymer density is greater than 0.935 g/cc;
    the olefin polymer density is at least 0.02 g/cc higher than the olefin copolymer density;
    or any combination thereof.

4. The method of claim 1, wherein:
the heat transfer coefficient of the loop slurry reactor increases by at least 57 W/m²/° C. (10 BTU/hr/ft²/° F.);
the heat transfer coefficient of the loop slurry reactor increases by at least 5%;
or both.

5. The method of claim 1, wherein:
a ratio of circulation velocity in the loop slurry reactor to pump pressure drop of the loop slurry reactor increases by at least 27,450 L/min/MPa (50 gallons/min/psi);
a ratio of circulation velocity in the loop slurry reactor to pump pressure drop of the loop slurry reactor increases by at least 10%;
a ratio of loop slurry reactor pump power consumption to slurry density in the loop reactor decreases by at least 31,214 W/g/cc (500 W/lb/ft³);
a ratio of loop slurry reactor pump power consumption to slurry density in the loop reactor decreases by at least 5%;
or any combination thereof.

6. The method of claim 1, wherein steps (a) and (b) are performed sequentially.

7. The method of claim 1, wherein the olefin monomer comprises ethylene.

8. The method of claim 7, wherein the olefin comonomer comprises 1-butene, 1-hexene, 1-octene, or combination thereof.

9. The method of claim 1, wherein the catalyst system comprises chromium, vanadium, titanium, zirconium, hafnium, or a combination thereof.

10. The method of claim 1, wherein the catalyst system is a chromium-based catalyst system, a Ziegler-based catalyst system, a metallocene-based catalyst system, or a combination thereof.

11. The method of claim 1, wherein the catalyst system is a metallocene-based catalyst system.

12. The method of claim 1, wherein the catalyst system is a dual catalyst system comprising at least one metallocene compound.

13. The method of claim 1, wherein the catalyst system is a dual catalyst system comprising two different metallocene compounds.

14. A method for removing polymer skins from reactor walls in a polymerization reactor system comprising a loop slurry reactor, wherein the polymer skins are present on at least a portion of the reactor walls, the method comprising:
(I) a first polymerization step comprising contacting a catalyst system, an olefin monomer, and a first olefin comonomer in the loop slurry reactor under first polymerization conditions to produce an olefin copolymer;
(II) a second polymerization step comprising (a) removing some or all of the first olefin comonomer to produce an olefin polymer having a density at least 0.015 g/cc higher than the olefin copolymer density; and (b) increasing a polymerization temperature of the loop slurry reactor by at least 6° C. (11° F.); and
(III) a third polymerization step comprising contacting the catalyst system, the olefin monomer, and the first olefin comonomer in the loop slurry reactor under conditions substantially the same as the first polymerization conditions to produce the olefin copolymer;
wherein, when measured at the same reactor temperature and weight percent solids, a heat transfer coefficient of the loop slurry reactor in step (III) is at least 28 W/m²/° C. (4.9 BTU/hr/ft²/° F.) higher than a heat transfer coefficient of the loop slurry reactor in step (I).

15. The method of claim 14, wherein:
the polymerization temperature of the loop slurry reactor increases by at least 17° C. (30° F.);
the olefin polymer density is at least 0.03 g/cc higher than the olefin copolymer density;
a ratio of circulation velocity in the loop slurry reactor to pump pressure drop of the loop slurry reactor in step (III) is at least 54,900 L/min/MPa (100 gallons/min/psi) higher than a ratio of circulation velocity in the loop slurry reactor to pump pressure drop of the loop slurry reactor in step (I);
a ratio of loop slurry reactor pump power consumption to slurry density in the loop reactor in step (III) is at least 62,428 W/g/cc (1000 W/lb/ft³) less than a ratio of loop slurry reactor pump power consumption to slurry density in the loop reactor in step (I);
or any combination thereof.

16. A method for removing polymer skins from reactor walls in a polymerization reactor system comprising a loop slurry reactor, wherein the polymer skins are present on at least a portion of the reactor walls, the method comprising:
(a) removing some or all of an olefin comonomer from the polymerization reactor system to increase polymer density by at least 0.015 g/cc; and
(b) increasing a polymerization temperature of the loop slurry reactor by at least 6° C. (11° F.);
wherein a heat transfer coefficient of the loop slurry reactor increases by at least 28 W/m²/° C. (4.9 BTU/hr/ft²/° F.).

17. The method of claim 16, wherein the heat transfer coefficient of the loop slurry reactor increases by at least 57 W/m²/° C. (10 BTU/hr/ft²/° F.).

18. The method of claim 16, wherein:
the polymer density is increased by at least 0.02 g/cc;
the polymerization temperature is increased by at least 11° C. (20° F.);
the heat transfer coefficient of the loop slurry reactor is increased by at least 10%;
the heat transfer coefficient of the loop slurry reactor is increased by at least 114 W/m²/° C. (20 BTU/hr/ft²/° F.);
the conditions of steps (a) and (b) are maintained for at least 4 days;
or any combination thereof.

19. The method of claim 16, wherein the method further comprises monitoring a process variable to detect an undesired condition in the polymerization reactor system, and when the undesired condition has reached a predetermined critical level, performing step (a) and step (b).

20. The method of claim 16, wherein:
the olefin comonomer comprises 1-butene, 1-hexene, 1-octene, or combination thereof;
the polymer density is increased by from 0.015 to 0.06 g/cc;
the polymerization temperature is increased by from 6° C. (11° F.) to 25° C. (45° F.); and
the heat transfer coefficient of the loop slurry reactor is increased by from 2% to 20%.

21. The method of claim 20, wherein:
a ratio of circulation velocity in the loop slurry reactor to pump pressure drop of the loop slurry reactor increases by from 5% to 50%;
a ratio of loop slurry reactor pump power consumption to slurry density in the loop reactor decreases by from 2% to 20%; or
both.

22. The method of claim 14, wherein the catalyst system comprises chromium, vanadium, titanium, zirconium, hafnium, or a combination thereof.

23. The method of claim 14, wherein the catalyst system comprises at least one metallocene compound.

24. The method of claim 14, wherein:
- the olefin monomer comprises ethylene, and the first olefin comonomer comprises 1-butene, 1-hexene, 1-octene, or combination thereof;
- the olefin polymer density is from 0.015 to 0.06 g/cc higher than the olefin copolymer density;
- the polymerization temperature is increased by from 6° C. (11° F.) to 25° C. (45° F.); and
- the heat transfer coefficient of the loop slurry reactor in step (III) is from 2% to 20% higher than a heat transfer coefficient of the loop slurry reactor in step (I).

25. The method of claim 24, wherein:
- a ratio of circulation velocity in the loop slurry reactor to pump pressure drop of the loop slurry reactor in step (III) is from 5% to 50% higher than a ratio of circulation velocity in the loop slurry reactor to pump pressure drop of the loop slurry reactor in step (I);
- a ratio of loop slurry reactor pump power consumption to slurry density in the loop reactor in step (III) is from 2% to 20% less than a ratio of loop slurry reactor pump power consumption to slurry density in the loop reactor in step (I);
- or both.

26. The method of claim 24, wherein the catalyst system is a metallocene-based catalyst system.

27. The method of claim 24, wherein the catalyst system is a dual catalyst system comprising at least one metallocene compound.

* * * * *